United States Patent
Lee et al.

(10) Patent No.: US 9,967,829 B2
(45) Date of Patent: *May 8, 2018

(54) METHOD OF TRANSMITTING UPLINK CONTROL INFORMATION IN WIRELESS COMMUNICATION SYSTEM SUPPORTING CHANGE OF USAGE OF RADIO RESOURCE AND APPARATUS THEREFOR

(71) Applicant: LG ELECTRONICS INC., Seoul (KR)

(72) Inventors: Seungmin Lee, Seoul (KR); Hanbyul Seo, Seoul (KR); Suckchel Yang, Seoul (KR); Inkwon Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/584,880

(22) Filed: May 2, 2017

(65) Prior Publication Data

US 2017/0238263 A1  Aug. 17, 2017

Related U.S. Application Data

(63) Continuation of application No. 14/679,829, filed on Apr. 6, 2015, now Pat. No. 9,674,790.
(Continued)

(51) Int. Cl.
*H04W 52/14* (2009.01)
*H04W 72/04* (2009.01)
(Continued)

(52) U.S. Cl.
CPC ......... *H04W 52/146* (2013.01); *H04L 5/0091* (2013.01); *H04L 5/14* (2013.01);
(Continued)

(58) Field of Classification Search
CPC ............... H04W 52/146; H04W 52/16; H04W 72/0446; H04W 72/0413; H04W 52/243;
(Continued)

(56) References Cited

U.S. PATENT DOCUMENTS 9,674,790 B2   6/2017  Lee et al.
2011/0122805 A1   5/2011  Abraham et al.
(Continued)

FOREIGN PATENT DOCUMENTS

CN   102823306   12/2012
JP   2013034114   2/2013
(Continued)

OTHER PUBLICATIONS

Samsung, "UL Power Control for eIMTA," 3GPP TSG RAN WG1 #74, R1-133090, Aug. 2013, 5 pages.
(Continued)

*Primary Examiner* — Brian D Nguyen
(74) *Attorney, Agent, or Firm* — Lee Hong Degerman Kang Waimey

(57) ABSTRACT

The present invention relates to a method of transmitting uplink control information (UCI), which is transmitted by a user equipment in a wireless communication system. In particular, the method includes the steps of receiving first offset information associated with uplink control information (UCI) transmission in uplink subframes according to uplink-downlink configuration of a serving cell and receiving a power control parameter configuring a first uplink power control subframe set and a second uplink power control subframe set for the uplink subframes. In this case, the first uplink power control subframe set and the second uplink power control subframe set are configured to be independently applied by an offset for transmitting the uplink control information.

8 Claims, 13 Drawing Sheets

Related U.S. Application Data

(60) Provisional application No. 61/976,514, filed on Apr. 8, 2014, provisional application No. 61/977,072, filed on Apr. 8, 2014, provisional application No. 61/979,007, filed on Apr. 14, 2014.

(51) Int. Cl.

| | | |
|---|---|---|
| *H04L 5/00* | (2006.01) | |
| *H04W 36/00* | (2009.01) | |
| *H04W 52/24* | (2009.01) | |
| *H04W 24/08* | (2009.01) | |
| *H04W 40/24* | (2009.01) | |
| *H04W 48/14* | (2009.01) | |
| *H04W 52/16* | (2009.01) | |
| *H04L 5/14* | (2006.01) | |

(52) U.S. Cl.
CPC ....... *H04W 24/08* (2013.01); *H04W 36/0083* (2013.01); *H04W 40/246* (2013.01); *H04W 48/14* (2013.01); *H04W 52/16* (2013.01); *H04W 52/243* (2013.01); *H04W 72/0413* (2013.01); *H04W 72/0446* (2013.01)

(58) Field of Classification Search
CPC ... H04W 24/08; H04W 40/246; H04W 48/14; H04W 36/0083; H04L 5/0091; H04L 5/14
See application file for complete search history.

(56) References Cited

U.S. PATENT DOCUMENTS

| | | | | |
|---|---|---|---|---|
| 2011/0250899 | A1* | 10/2011 | Vajapeyam | ........... H04W 52/40 455/450 |
| 2011/0274059 | A1* | 11/2011 | Brown | ................ H04L 27/0008 370/329 |
| 2011/0310986 | A1* | 12/2011 | Heo | ........................ H04L 5/001 375/259 |
| 2012/0113907 | A1 | 5/2012 | Baldemair et al. | |
| 2012/0127911 | A1* | 5/2012 | Nishikawa | ............. H04B 7/024 370/312 |
| 2012/0170533 | A1 | 7/2012 | Ahn et al. | |
| 2012/0257519 | A1 | 10/2012 | Frank et al. | |
| 2013/0286948 | A1 | 10/2013 | Gao et al. | |
| 2014/0018123 | A1 | 1/2014 | Frank et al. | |
| 2014/0029532 | A1* | 1/2014 | Han | ................. H04W 72/0413 370/329 |
| 2014/0105110 | A1 | 4/2014 | Hoshino et al. | |
| 2014/0126440 | A1 | 5/2014 | Frank et al. | |
| 2014/0153534 | A1 | 6/2014 | Kim et al. | |
| 2014/0169322 | A1 | 6/2014 | Ouchi et al. | |
| 2014/0301256 | A1 | 10/2014 | Yao et al. | |
| 2015/0195822 | A1 | 7/2015 | Han et al. | |

FOREIGN PATENT DOCUMENTS

| | | |
|---|---|---|
| KR | 1020140034803 | 3/2014 |
| WO | 2013/139245 | 9/2013 |

OTHER PUBLICATIONS

Samsung, "DL and UL Power Control for eIMTA," 3GPP TSG RAN WG1 #73, R1-131965, May 2013, 4 pages.
Nokia Corporation, et al., "Enhanced uplink power control for dynamic TDD UL/DL reconfiguration," 3GPP TSG-RAN WG1 Meeting #73, R1-132295, May 2013, 9 pages.
PCT International Application No. PCT/KR2015/002916, Written Opinion of the International Searching Authority dated Jul. 8, 2015, 9 pages.
Taiwan Intellectual Property Office Application No. 104111294, Office Action dated Apr. 25, 2016, 24 pages.
European Patent Office Application Serial No. 15776947.2, Search Report dated Sep. 25, 2017, 9 pages.
Samsung, "UCI Multiplexing in PUSCH", R1-140349, 3GPP TSG RAN WG1 #76, Feb. 2014, 3 pages.
New Postcom, "Discussion on RRC impact of TDD eIMTA", R1-141369, 3GPP TSG RAN WG1 Meeting #76bis, Apr. 2014, 2 pages.
3rd Generation Partnership Project; Technical Specification Group Radio Access Network; Evolved Universal Terrestrial Radio Access (E-UTRA); Physical layer procedures (Release 12), 3GPP TS 36.213 V12.1.0, Mar. 2014, 186 pages.
Catt, "Outcome of the offline discussion on eIMTA", R1-141842, 3GPP TSG RAN WG1 Meeting #76bis, Apr. 2014, 2 pages.
Session Chairman (Qualcomm Inc.), "Summary of Ad-hoc session on Further Enhancements to LTE TDD for DL-UL Interference Management and Traffic Adaptation", R1-141871, 3GPP TSG RAN WG1 Meeting #76bis, Apr. 2014, 3 pages.
LG Electronics, "Remaining Details of Uplink Power Control for TDD eIMTA", R1-135452, 3GPP TSG RAN WG1 Meeting #75, Nov. 2013, 4 pages.

\* cited by examiner

FIG. 2
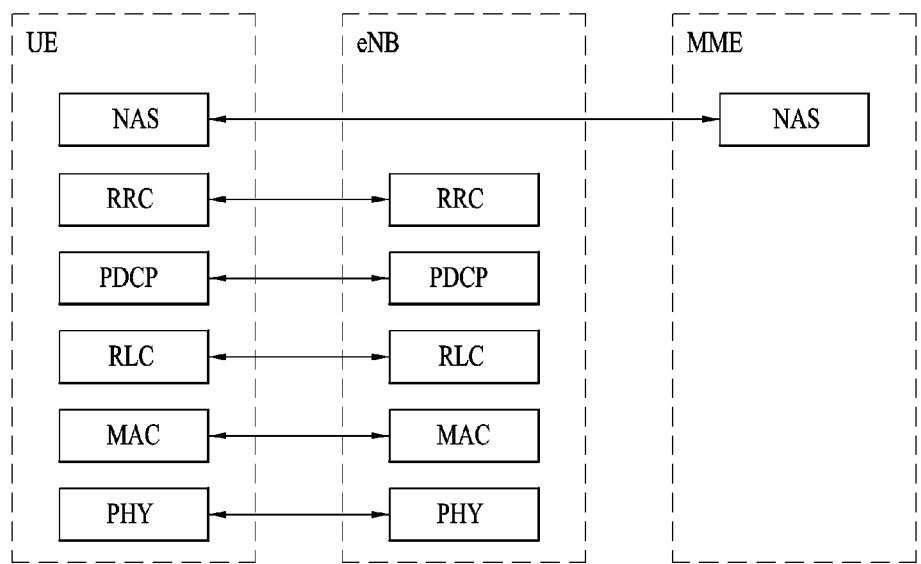
(a) control-plane protocol stack
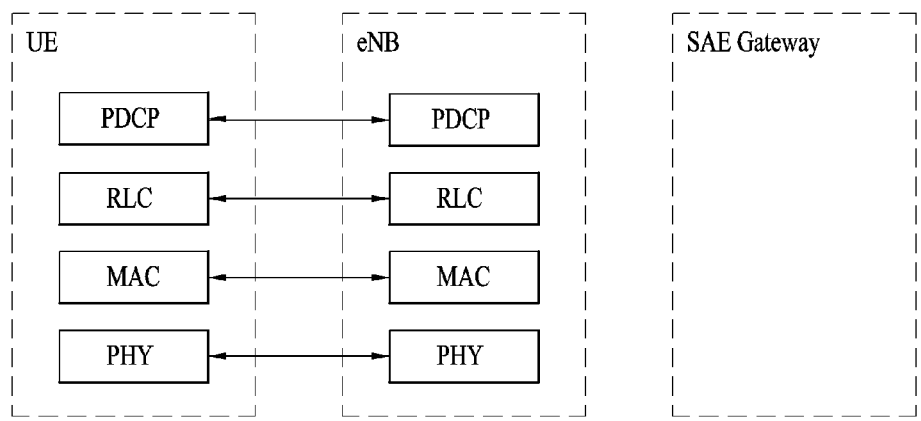
(b) user-plane protocol stack

METHOD OF TRANSMITTING UPLINK CONTROL INFORMATION IN WIRELESS COMMUNICATION SYSTEM SUPPORTING CHANGE OF USAGE OF RADIO RESOURCE AND APPARATUS THEREFOR

This application is a continuation of U.S. patent application Ser. No. 14/679,829, filed on Apr. 6, 2015, now U.S. Pat. No. 9,674,790, which claims the benefit of U.S. Provisional Patent Application Nos. 61/976,514 filed on Apr. 8, 2014, 61/977,072 filed Apr. 8, 2014 and 61/979,007 filed on Apr. 14, 2014, the contents of which are all hereby incorporated by reference herein in their entirety.

BACKGROUND OF THE INVENTION

Field of the Invention

The present invention relates to a wireless communication system, and more particularly, to a method of transmitting uplink control information in a wireless communication system supporting change of usage of a radio resource and an apparatus therefor.

Discussion of the Related Art

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The user equipment reports status information of a current channel to the base station periodically and/or non-periodically to assist the base station to efficiently manage the wireless communication system. Since the reported status information may include results calculated considering various statuses, more efficient reporting method will be required.

SUMMARY OF THE INVENTION

Accordingly, the present invention is directed to an apparatus and method thereof that substantially obviate one or more problems due to limitations and disadvantages of the related art.

An object of the present invention is to provide a method of transmitting uplink control information in a wireless communication supporting change of usage of a radio resource and an apparatus therefor based on the discussion mentioned in the foregoing description.

Technical tasks obtainable from the present invention are non-limited the above-mentioned technical task. And, other unmentioned technical tasks can be clearly understood from the following description by those having ordinary skill in the technical field to which the present invention pertains.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of transmitting UCI (uplink control information), which is transmitted by a user equipment in a wireless communication system, includes the steps of receiving first offset information associated with uplink control information (UCI) transmission in uplink subframes according to uplink-downlink configuration of a serving cell and receiving a power control parameter configuring a first uplink power control subframe set and a second uplink power control subframe set for the uplink subframes. In this case, the first uplink power control subframe set and the second uplink power control subframe set are configured to be independently applied by an offset for transmitting the uplink control information.

Preferably, the first offset information configured for the uplink subframes can be applied to the first uplink power control subframe set to transmit the uplink control information.

Preferably, second offset information indicated by upper layer signaling can be applied to the second uplink power control subframe set to transmit the uplink control information.

Preferably, the power control parameter can be received via upper layer signaling.

Preferably, the method can further include the step of receiving a power control parameter releasing the first uplink power control subframe set and the second uplink power control subframe set. More preferably, if the first uplink power control subframe set and the second uplink power control subframe set are released, the uplink subframes can be configured to be applied by the first offset information.

Preferably, the offset information can be used to transmit the uplink control information on PUSCH (physical uplink shared channel). More preferably, the offset information can be configured for at least one selected from the group consisting of a HARQ-ACK, an RI (rank indicator) and a CQI (channel quality indicator).

To further achieve these objects and other advantages and in accordance with the purpose of the invention, as embodied and broadly described herein, according to a different embodiment, a method of transmitting uplink control information, which is transmitted by a user equipment in a wireless communication system supporting carrier aggregation (CA), includes the steps of receiving first offset information associated with uplink control information (UCI) transmission in uplink subframes according to uplink-downlink configuration of serving cells and receiving a power control parameter configuring a first uplink power control subframe set and a second uplink power control subframe set for at least one or more serving cells among the serving cells. In this case, the first uplink power control subframe set and the second uplink power control subframe set can be configured to be independently applied by an offset for transmitting the uplink control information.

Preferably, first offset information configured for the uplink subframes can be applied to a first serving cell to which the first uplink power control subframe set is configured among the serving cells to transmit the uplink control information.

Preferably, second offset information indicated via upper layer signaling can be applied to a second serving cell to which the second uplink power control subframe set is configured among the serving cells to transmit the uplink control information.

To further achieve these objects and other advantages and in accordance with the purpose of the invention, as embodied and broadly described herein, according to a different embodiment, a user equipment transmitting uplink control information in a wireless communication system includes a radio frequency unit and a processor, the processor configured to receive first offset information associated with uplink control information (UCI) transmission in uplink subframes according to uplink-downlink configuration of a serving cell, the processor configured to receive a power control parameter configuring a first uplink power control subframe set and a second uplink power control subframe set for the uplink subframes. In this case, the first uplink power control subframe set and the second uplink power control subframe set can be configured to be independently applied by an offset for transmitting the uplink control information.

According to embodiment of the present invention, it is able to efficiently transmit uplink control information in a wireless communication system supporting change of usage of a radio resource.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram for structures of control and user planes of radio interface protocol between a 3GPP radio access network standard-based user equipment and E-UTRAN;

DETAILED DESCRIPTION OF THE INVENTION

Figure 1:
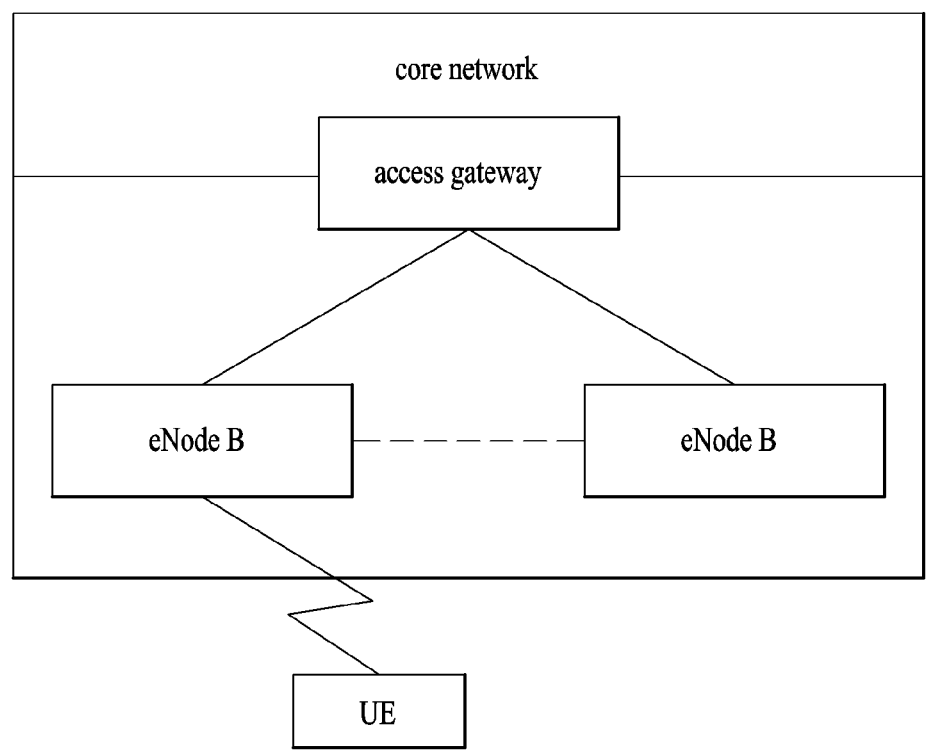
FIG. 1 is a schematic diagram of E-UMTS network structure as one example of a wireless communication system.

Reference will now be made in detail to the preferred embodiments of the present invention, examples of which are illustrated in the accompanying drawings. Wherever possible, the same reference numbers will be used throughout the drawings to refer to the same or like parts.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
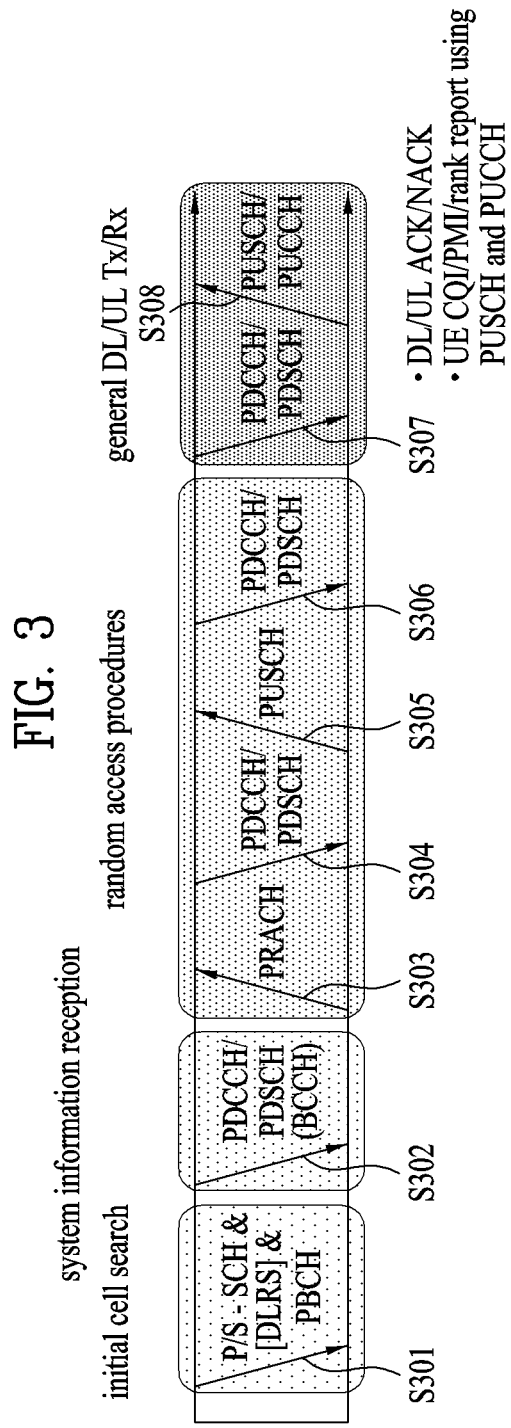
FIG. 3 is a diagram for explaining physical channels used for 3GPP system and a general signal transmission method using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
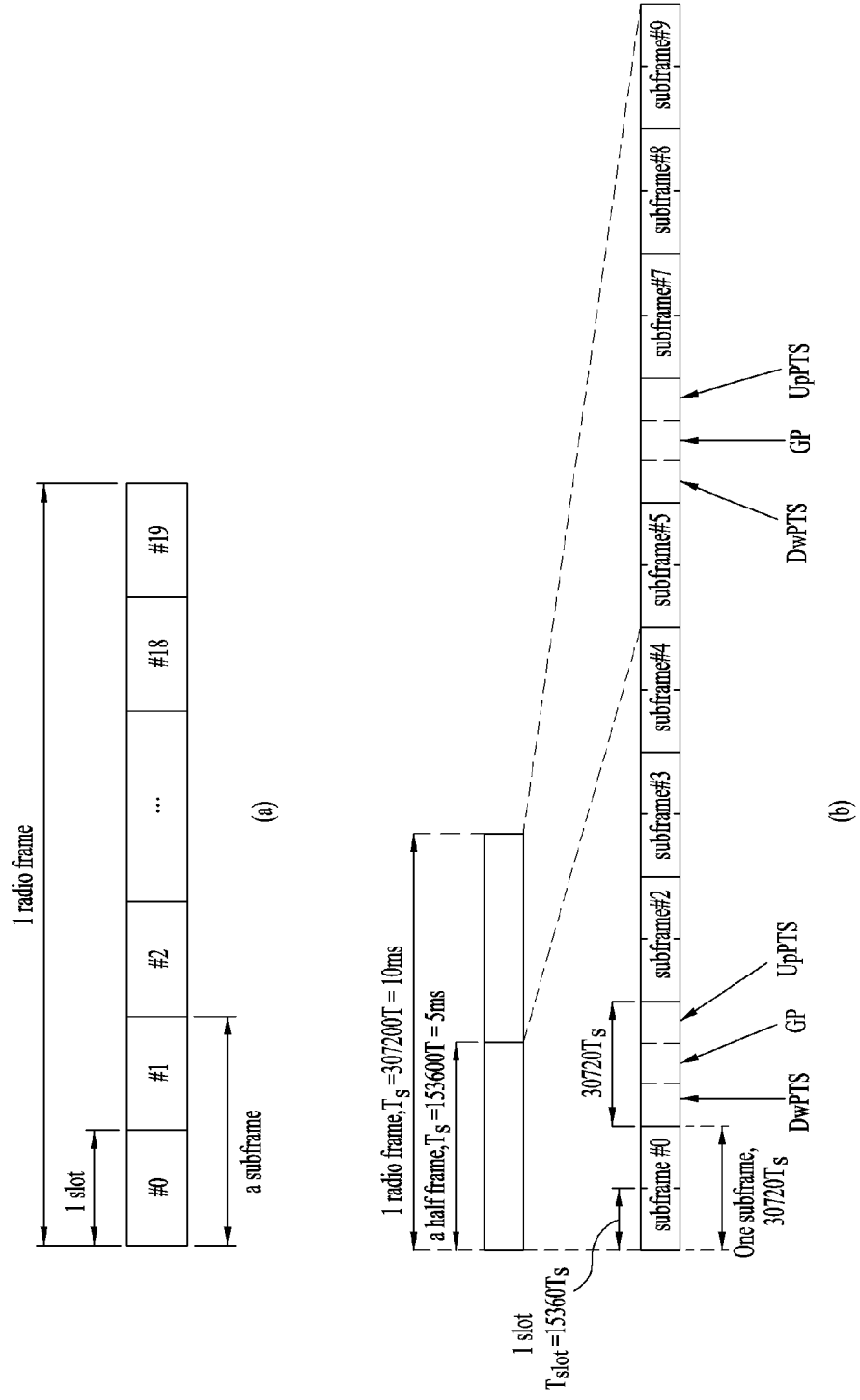
FIG. 4 is a diagram for a structure of a radio frame in LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of , and the other region is configured for the guard period.

TABLE 1

| | Normal cyclic prefix in downlink | | | Extended cyclic prefix in downlink | | |
| --- | --- | --- | --- | --- | --- | --- |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7860 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
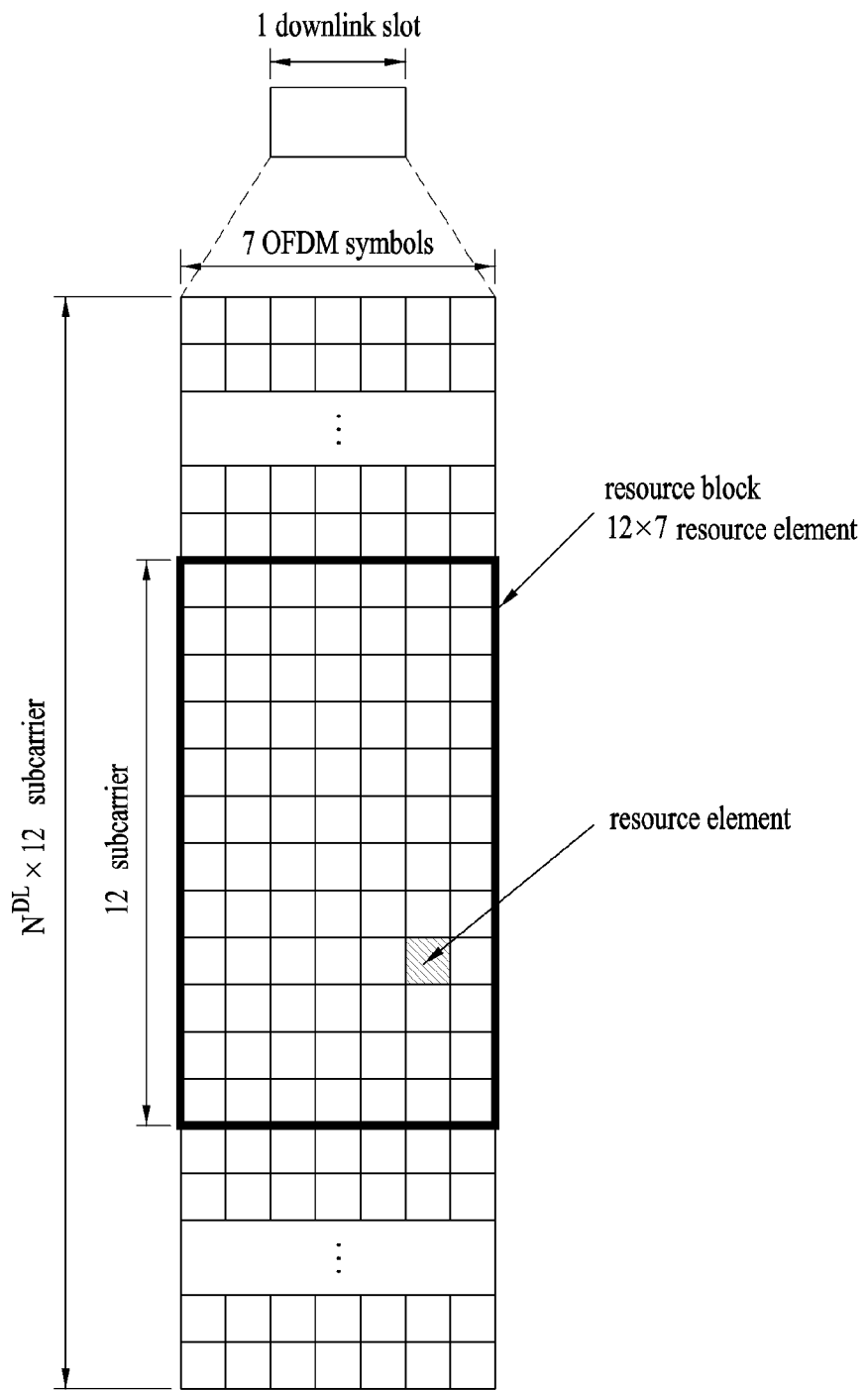
FIG. 5 is a diagram for one example of a resource grid for a downlink slot.

FIG. 5 is a diagram illustrating a resource grid of a downlink slot.

Referring to FIG. 5, the downlink slot includes a plurality of OFDM symbols in a time domain and a plurality of resource blocks in a frequency domain. Since each resource block includes subcarriers, the downlink slot includes x subcarriers in the frequency domain. Although FIG. 5 illustrates that the downlink slot includes seven OFDM symbols and the resource block includes twelve subcarriers, it is to be understood that the downlink slot and the resource block are not limited to the example of FIG. 5. For example, the number of OFDM symbols included in the downlink slot may be varied depending on the length of the CP.

Each element on the resource grid will be referred to as a resource element (RE). One resource element is indicated by one OFDM symbol index and one subcarrier index. One RB includes x number of resource elements. The number of resource blocks included in the downlink slot depends on a downlink transmission bandwidth configured in the cell.

Figure 6:
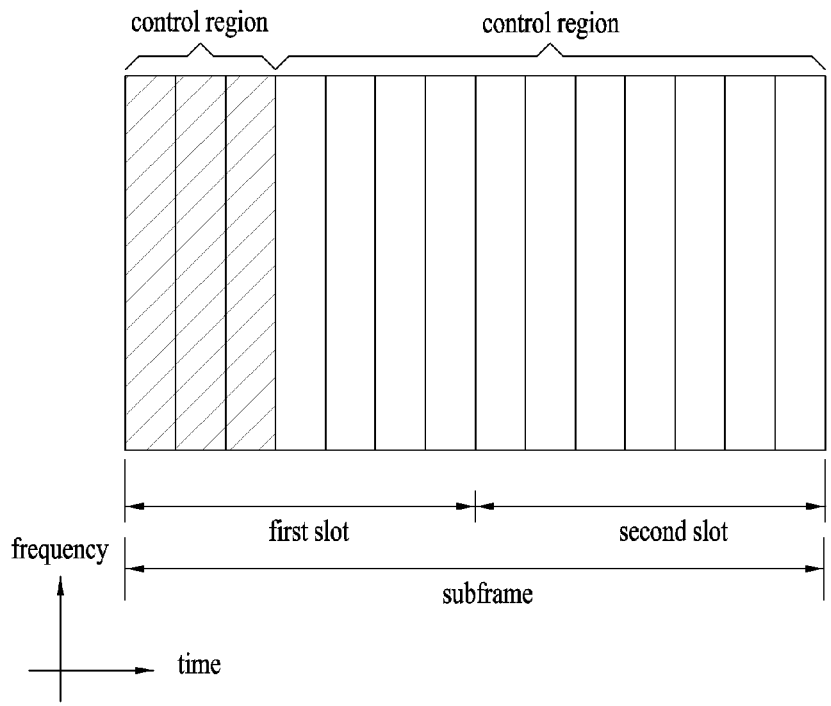
FIG. 6 is a diagram for an example of a structure of a downlink subframe.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI).

The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
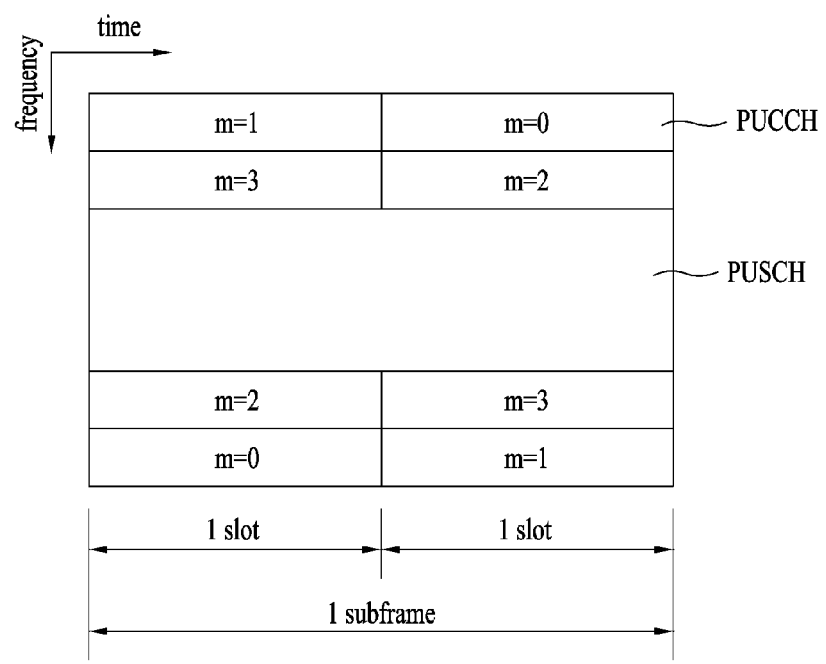
FIG. 7 is a diagram for an example of a structure of an uplink subframe.

FIG. 7 is a diagram illustrating a structure of an uplink subframe used in an LTE system.

Referring to FIG. 7, the uplink subframe includes a plurality of slots (for example, two). Each slot may include a plurality of SC-FDMA symbols, wherein the number of SC-FDMA symbols included in each slot is varied depending on a cyclic prefix (CP) length. The uplink subframe is divided into a data region and a control region in a frequency domain. The data region includes a PUSCH, and is used to transmit a data signal such as voice. The control region includes a PUCCH, and is used to transmit uplink control information (UCI). The PUCCH includes RB pair located at both ends of the data region on a frequency axis, and performs hopping on the border of the slots.

The PUCCH may be used to transmit the following control information.

SR (Scheduling Request): is information used to request uplink UL-SCH resource. The SR is transmitted using an on-off keying (OOK) system.

HARQ ACK/NACK: is a response signal to a downlink data packet on the PDSCH. It represents whether the downlink data packet has been successfully received. ACK/NACK 1 bit is transmitted in response to a single downlink codeword (CW), and ACK/NACK 2 bits are transmitted in response to two downlink codewords.

CSI (Channel State Information): is feedback information on a downlink channel. The CSI includes CQI (Channel Quality Indicator), and MIMO (Multiple Input Multiple Output) related feedback information includes a rank indicator (RI), a precoding matrix indicator (PMI), a precoding type indicator (PTI), etc. 20 bits are used per subframe.

The quantity of the uplink control information (UCI) that may be transmitted from the user equipment for the subframe depends on the number of SC-FDMA symbols available for control information transmission. The SC-FDMA symbols available for control information transmission mean the remaining SC-FDMA symbols except for SC-FDMA symbols for reference signal transmission for the subframe, and the last SC-FDMA symbol of the subframe is excluded in case of the subframe for which a sounding reference signal (SRS) is set. The reference signal is used for coherent detection of the PUCCH.

In the following, PUCCH piggyback is explained.

In case of an uplink transmission of a legacy 3GPP LTE system (e.g., release-8), a single carrier transmission of a good PAPR (peak-to-average power ratio) or a good CM (cubic metric) influencing the performance of a power amp is maintained to efficiently utilize the power amp of a UE. In particular, in case of a PUSCH transmission of a legacy LTE system, a single carrier property of a data intended to be transmitted is maintained by a DFT-precoding. In case of a PUCCH transmission, the single carrier property can be maintained by transmitting a sequence having the single carrier property in a manner of loading information on the sequence. Yet, in case of non-contiguously assigning a DFT-precoded data to a frequency axis or in case of simultaneously transmitting PUSCH and PUCCH, the single carrier property is not maintained.

Figure 8:
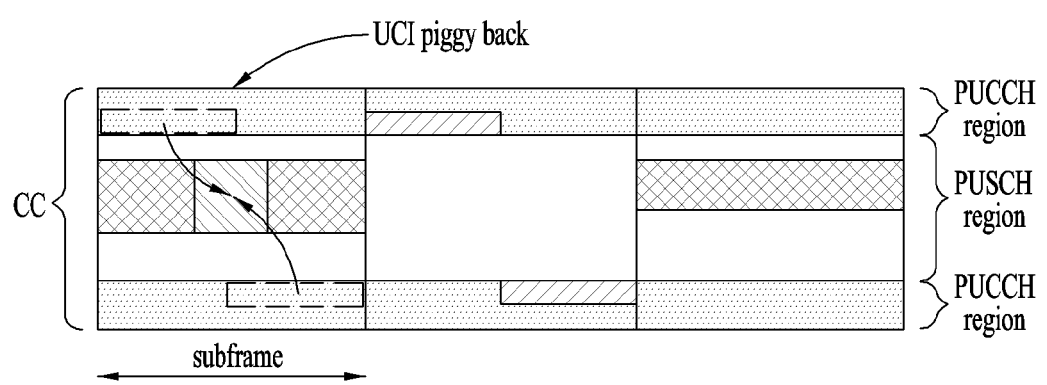
FIG. 8 is a diagram for explaining PUCCH piggyback.

Hence, as depicted in FIG. 8, in case that there is PUSCH transmission in a subframe identical to PUCCH transmission, UCI (uplink control information) supposed to be transmitted on PUCCH is transmitted (piggyback) on PUSCH together with a data to maintain the single carrier property.

As mentioned in the foregoing description, since PUCCH and PUSCH cannot be transmitted in a legacy LTE UE at the same time, in a subframe to which the PUSCH is transmitted, a method of multiplexing the UCI (CQI/PMI, HARQ-ACK, RI, and the like) in the PUSCH region is used. As an example, in case of transmitting CQI and/or PMI in a subframe assigned to transmit PUSCH, control information and a data can be transmitted together by multiplexing UL-SCH data and the CQI/PMI prior to a DFT-spreading. In this case, the UL-SCH data performs a rate-matching in consideration of a CQI/PMI resource. And, such control information as a HARQ ACK, an RI, and the like can be multiplexed in a PUSCH region in a manner of puncturing the UL-SCH data.

Figure 9:
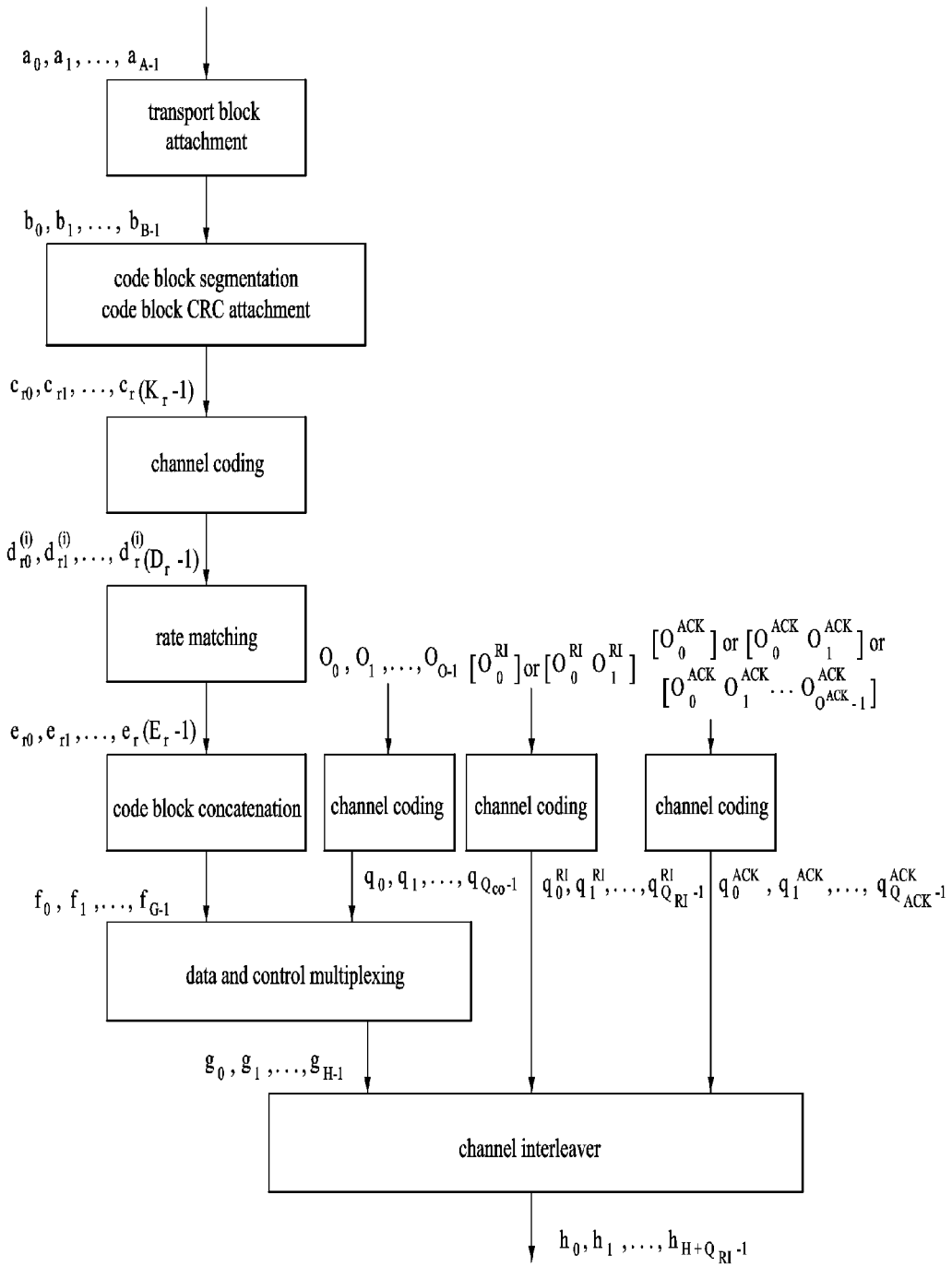
FIG. 9 is a diagram for an example of processing UL-SCH data and control information.

FIG. 9 is a diagram for an example of processing UL-SCH data and control information.

Referring to FIG. 9, data transmitted on UL-SCH is delivered to a coding unit in a TB (transport block) form in every transmission time interval (TTI).

A parity bit $P_0, P_1, P_2, P_3, \ldots, P_{L-1}$ is attached to a bit $a_0, a_1, a_2, a_3, \ldots, a_{A-1}$ of a transport block delivered from an upper layer. In this case, a size of the transport block corresponds to A and the number of parity bits corresponds to L=24. As an error detection code, an input bit to which a CRC (cyclic redundancy check) bit is attached can be represented as $b_0, b_1, b_2, b_3, \ldots, b_{B-1}$. In this case, B indicates the number of bits of a transport block including the CRC [S900].

The $b_0, b_1, b_2, b_3, \ldots, b_{B-1}$ is segmented into a plurality of code blocks (CBs) according to a size of a TB and a CRC is attached to a plurality of the segmented CBs. Bits where a code block is segmented and the CRC is attached correspond to $c_{r0}, c_{r1}, c_{r2}, c_{r3}, \ldots, c_{r(K_r-1)}$. In this case, r corresponds to a number of a code block (r=0, ..., C−1) and Kr corresponds to the number of bits according to the code block r. And, c indicates the total number of code blocks [S910].

Subsequently, a channel coding step is performed on the $c_{r0}, c_{r1}, c_{r2}, c_{r3}, \ldots, c_{r(K_r-1)}$, which is inputted to a channel coding unit. Bits after the channel coding become $d_{r0}^{(i)}, d_{r1}^{(i)}, d_{r2}^{(i)}, d_{r3}^{(i)}, \ldots, d_{r(D_r-1)}^{(i)}$. In this case, i corresponds to an index (i=0, 1, and 2) of a coded data stream and $D_r$ indicates the number of bits of an $i^{th}$ coded data stream for a code block r (i.e., $D_r=K_r+4$). r indicates a code block number (r=0, 1, ..., C−1) and $K_r$ indicates the number of bits of a code block r. And, C indicates the total number of code blocks. In embodiments of the present invention, channel coding can be performed on each code block using a turbo coding scheme [S920].

After the channel coding is performed, a rate matching step is performed. Bits after the rate matching correspond to $e_{r0}, e_{r1}, e_{r2}, e_{r3}, \ldots, e_{r(E_r-1)}$. In this case, $E_r$ indicates the number of rate matched bits of an $r^{th}$ code block (where r=0, 1, ..., C−1) and C indicates the total number of code blocks [S930].

A code block concatenation process is performed after the rate matching step. Bits after the code block concatenation become $f_0, f_1, f_2, f_3, \ldots, f_{G-1}$. In this case, G indicates the total number of coded bits. Yet, when control information is transmitted in a manner of being multiplexed with UL-SCH data, a bit used for transmitting the control information is not included in the G. The $f_0, f_1, f_2, f_3, \ldots f_{G-1}$ corresponds to a UL-SCH codeword [S940].

In case of channel quality information (CQI and/or PQI), RI and HARQ-ACK, channel coding is independently performed [S950, S960 and S970]. Channel coding for each UCI is performed based on the number of coded symbols for each control information. For instance, the number of coded symbols can be used to perform rate matching for coded control information. The number of coded symbols corresponds to the number of modulation symbols, the number of REs and the like in the following process.

Channel coding of channel quality information (CQI) is performed using an input bit sequence $o_0, o_1, o_2, \ldots, o_{O-1}$ [S950]. An output bit sequence of channel coding for the channel quality information becomes $q_0, q_1, q_2, q_3, \ldots, q_{Q_{CQI}-1}$. A channel coding scheme to be applied varies according to the number of bits of channel quality information. If the number of bits of the channel quality information is equal to or greater than 11 bits, CRC 8 bits are attached. $Q_{CQI}$ indicates the total number of coded bits for CQI. In order to match a length of a bit sequence to the $Q_{CQI}$, rate matching can be performed on coded channel quality information. It may be represented as $Q_{CQI}=Q'_{CQI}*Q_m$. In this case, the $Q'_{CQI}$ corresponds to the number of coded symbols for CQI and the $Q_m$ corresponds to a modulation order. The $Q_m$ and UL-SCH data are identically configured.

Channel coding of an RI is performed using an input bit sequence $[o_0^{RI}]$ or $[o_0^{RI} o_1^{RI}]$. The $[o_0^{RI}]$ and the $[o_0^{RI} o_1^{RI}]$ indicate 1-bit RI and 2-bit RI, respectively.

In case of the 1-bit RI, repetition coding is used. In case of the 2-bit RI, (3,2) simplex code is used for coding and encoded data can be circulated and repeated. In case of an RI equal to or greater than 3 bits or an RI equal to or less than 11 bits, the RI is coded using (32,0) RM code which is used for an uplink shared channel. In case of an RI equal to or greater than 12 bits, RI information is divided into two groups using a duplex RM structure and each group is coded using (32,0) RM code. An output bit sequence $q_0^{RI}$, $q_1^{RI}$, $q_2^{RI}$, . . . , $q_{Q_{RI}-1}^{RI}$ is obtained by combination of coded RI block(s). In this case, $Q_{RI}$ indicates the total number of coded bits for an RI. In order to match a length of a coded RI to the $Q_{RI}$, a lastly combined coded RI block may correspond to a partial block (i.e., rate matching). It may be represented as $Q_{RI}=Q'_{RI}*Q_m$. In this case, the $Q'_{RI}$ corresponds to the number of coded symbols for RI and the $Q_m$ corresponds to a modulation order. The $Q_m$ and UL-SCH data are identically configured.

Channel coding of HARQ-ACK is performed using an input bit sequence $[o_0^{ACK}]$, $[o_0^{ACK} \; o_1^{ACK}]$ or $[o_0^{ACK} \; o_1^{ACK} \ldots o_{O^{ACK}-1}^{ACK}]$ of the step S970. The $[o_0^{ACK}]$ and the $[o_0^{ACK} \; o_1^{ACK}]$ indicate a 1-bit HARQ-ACK and a 2-bit HARQ-ACK, respectively. And, the $[o_0^{ACK} \; o_1^{ACK} \ldots o_{O^{ACK}-1}^{ACK}]$ indicates HARQ-ACK consisting of information of two or more bits (i.e., $O^{ACK}>2$).

In this case, ACK is coded by 1 and NACK is coded by 0. In case of the 1-bit HARQ-ACK, repetition coding is used. In case of the 2-bit HARQ-ACK, (3,2) simplex code is used for coding and encoded data can be circulated and repeated. In case of HARQ-ACK equal to or greater than 3 bits or HARQ-ACK equal to or less than 11 bits, the HARQ-ACK is coded using (32,0) RM code which is used for an uplink shared channel. In case of HARQ-ACK equal to or greater than 12 bits, HARQ-ACK information is divided into two groups using a duplex RM structure and each group is coded using (32,0) RM code. A bit sequence $q_0^{ACK}$, $q_1^{ACK}$, $q_2^{ACK}$, . . . , $q_{Q_{ACK}-1}^{ACK}$ is obtained by combination of coded HARQ-ACK block(s). In order to match a length of the bit sequence to the $Q_{ACK}$, a lastly combined coded HARQ-ACK block may correspond to a partial block (i.e., rate matching). It may be represented as $Q_{ACK}=Q'_{ACK}*Q_m$. In this case, the $Q'_{ACK}$ corresponds to the number of coded symbols for HARQ-ACK and the $Q_m$ corresponds to a modulation order. The $Q_m$ and UL-SCH data are identically configured.

An input of a data/control multiplexing block corresponds to $f_0$, $f_1$, $f_2$, $f_3$, . . . $f_{G-1}$ indicating a coded US-SCH bit and $q_0$, $q_1$, $q_2$, $q_3$, . . . , $q_{Q_{CQI}-1}$ indicating a coded CQI/PMI bit [S980]. An output of the data/control multiplexing block corresponds to $g_0$, $g_1$, $g_2$, $g_3$, . . . , $q_{H'-1}$. In this case, $g_i$ corresponds to a column vector of a length $Q_m$ (i=0, . . . , H'−1). In this case, $g_i$(i=0, . . . , H'−1) indicates a column vector of $(Q_m \cdot N_L)$ length. It may be represented as H=(G+$N_L \cdot Q_{CQI}$) and H'=H/($N_L \cdot Q_m$). In this case, $N_L$ indicates the number of layers to which a UL-SCH transport block is mapped and H indicates the total number of coded bits allocated to the $N_L$ number of layers to which the transport block is mapped for UL-SCH data and CQI/PMI information. In this case, the H corresponds to the total number of coded bits allocated for the UL-SCH data and the CQI/PMI.

A channel interleaving step is performed for coded bits, which are inputted to a channel interleaver, in the channel interleaver. In this case, an input of the channel interleaver corresponds to an output of a data/control multiplexing block, $g_0$, $g_1$, $g_2$, . . . , $g_{H'-1}$, a coded rank indicator $q_0^{RI}$, $q_1^{RI}$, $q_2^{RI}$, . . . , $q_{Q'_{RI}-1}^{RI}$, and a coded HARQ-ACK $q_0^{ACK}$, $q_1^{ACK}$, $q_2^{ACK}$, . . . , $q_{Q'_{ACK}-1}^{ACK}$ [S990].

In the step S990, $g_i$ corresponds to a column vector of a length of $Q_m$ for CQI/PMI (where i=0, . . . , H'−1) (H'=H/$Q_m$). $q_i^{ACK}$ corresponds to a column vector of a length of $Q_m$ for ACK/NACK (where i=0, . . . , $Q'_{ACK}-1$) ($Q'_{ACK}=Q_{ACK}/Q_m$). $q_i^{RI}$ corresponds to a column vector of a length of $Q_m$ for RI (where i=0, . . . , $Q'_{RI}-1$) ($Q'_{RI}=Q_{RI}/Q_m$).

The channel interleaver multiplexes control information and/or UL-SCH data to transmit PUSCH. Specifically, the channel interleaver includes a process of mapping control information and UL-SCH data to a channel interleaver matrix corresponding to a PUSCH resource.

After the channel interleaving is performed, a bit sequence $h_0$, $h_1$, $h_2$, . . . , $h_{H+Q_{RI}-1}$ is outputted from the channel interleaver matrix, column by column. The outputted bit sequence is mapped to a resource grid.

Figure 10:
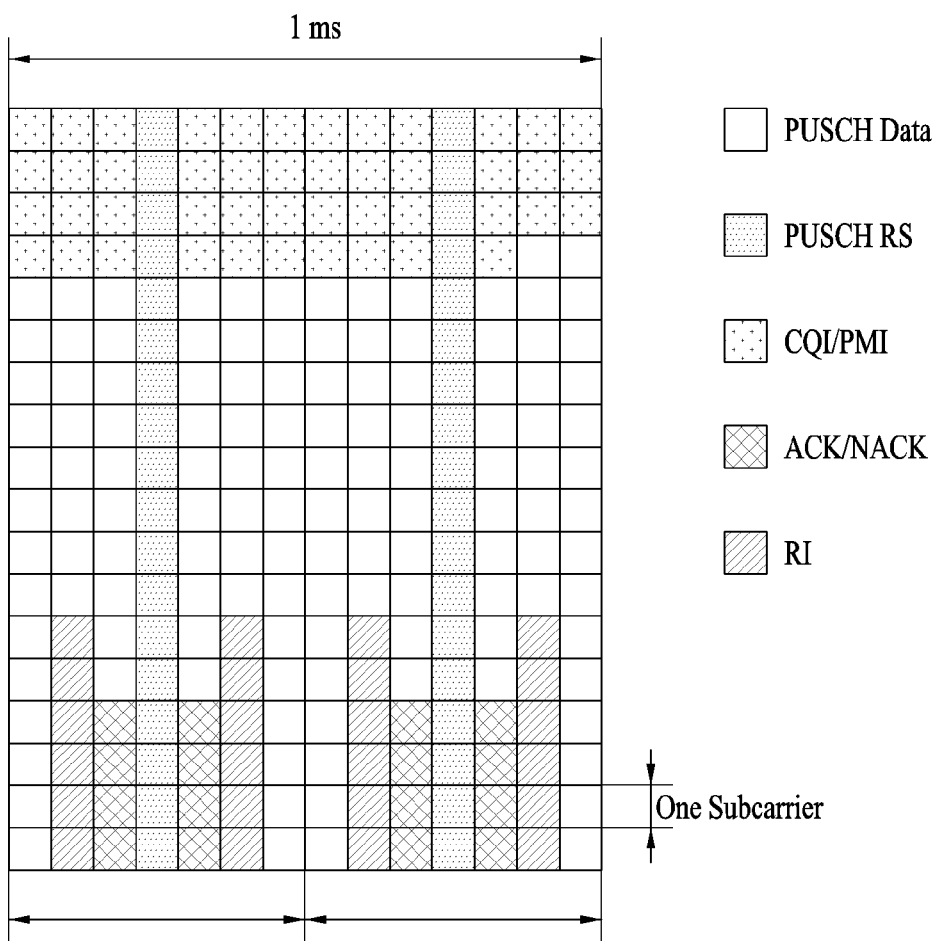
FIG. 10 is a diagram for an example of a method of multiplexing uplink control information and UL-SCH data on PUSCH.

FIG. 10 is a diagram for an example of a method of multiplexing uplink control information and UL-SCH data on PUSCH.

When a user equipment (UE) intends to transmit control information in a subframe to which PUSCH transmission is assigned, the UE multiplexes uplink control information (UCI) and UL-SCH data together before DFT-spreading is performed. The uplink control information (UCI) includes at least one selected from the group consisting of CQI/PMI, HARQ-ACK/NACK and RI.

Each of the number of REs used for transmitting CQI/PMI, ACK/NACK and RI is determined based on an MCS (modulation and coding scheme) and an offset value ($\Delta_{offset}^{CQI}$, $\Delta_{offset}^{HARQ-ACK}$, $\Delta_{offset}^{RI}$) assigned to transmit PUSCH. The offset value permits coding rates different from each other according to control information and is semi-statically configured by an upper layer (e.g., RRC layer) signal. UL-SCH data and control information are not mapped to an identical RE. Control information is mapped in a manner of being existed in both slots of a subframe. Since a base station is able to know that the control information is to be transmitted on PUSCH in advance, the base station can easily demultiplexes the control information and a data packet.

Referring to FIG. 10, a CQI and/or a PMI (CQI/PMI) resource is located at a starting point of a UL-SCH data resource, is sequentially mapped to all SC-FDMA symbols on a single subcarrier, and mapping is performed on a next subcarrier. The CQI/PMI is mapped from a left side to a right side in a subcarrier, i.e., in a direction that an SC-FDMA symbol index is increasing. Rate matching is performed on PUSCH data (UL-SCH data) in consideration of an amount of CQI/PMI resource (i.e., the number of coded symbols). A modulation order identical to UL-SCH data is used for CQI/PMI.

For instance, if a size (payload size) of CQI/PMI information is small (e.g., equal to or less than 11 bits), similar to PUCCH data transmission, (32, k) block code is used for the CQI/PMI information and coded data can be repeated. If the size of the CQI/PMI information is small, a CRC is not used.

If the size of the CQI/PMI information is big (e.g., greater than 11 bits), 8-bit CRC is attached and channel coding and rate matching are performed using a tail-biting convolution code. ACK/NACK is inserted into a part of SC-FDMA resources to which UL-SCH data is mapped by puncturing. The ACK/NACK is positioned at the side of an RS and is inserted from the bottom to the top in a corresponding SC-FDMA symbol, i.e., in a direction that a subcarrier index is increasing.

In case of a normal CP, as shown in FIG. 10, an SC-FDMA symbol for ACK/NACK is positioned at an SC-FDMA symbol #2 and #4 in each slot. A coded RI is positioned the side (i.e., a symbol #1 and #5) of a symbol for ACK/NACK irrespective of whether the ACK/NACK is actually transmitted in a subframe. In this case, the ACK/NACK, the RI and the CQI/PMI are independently coded.

Figure 11:
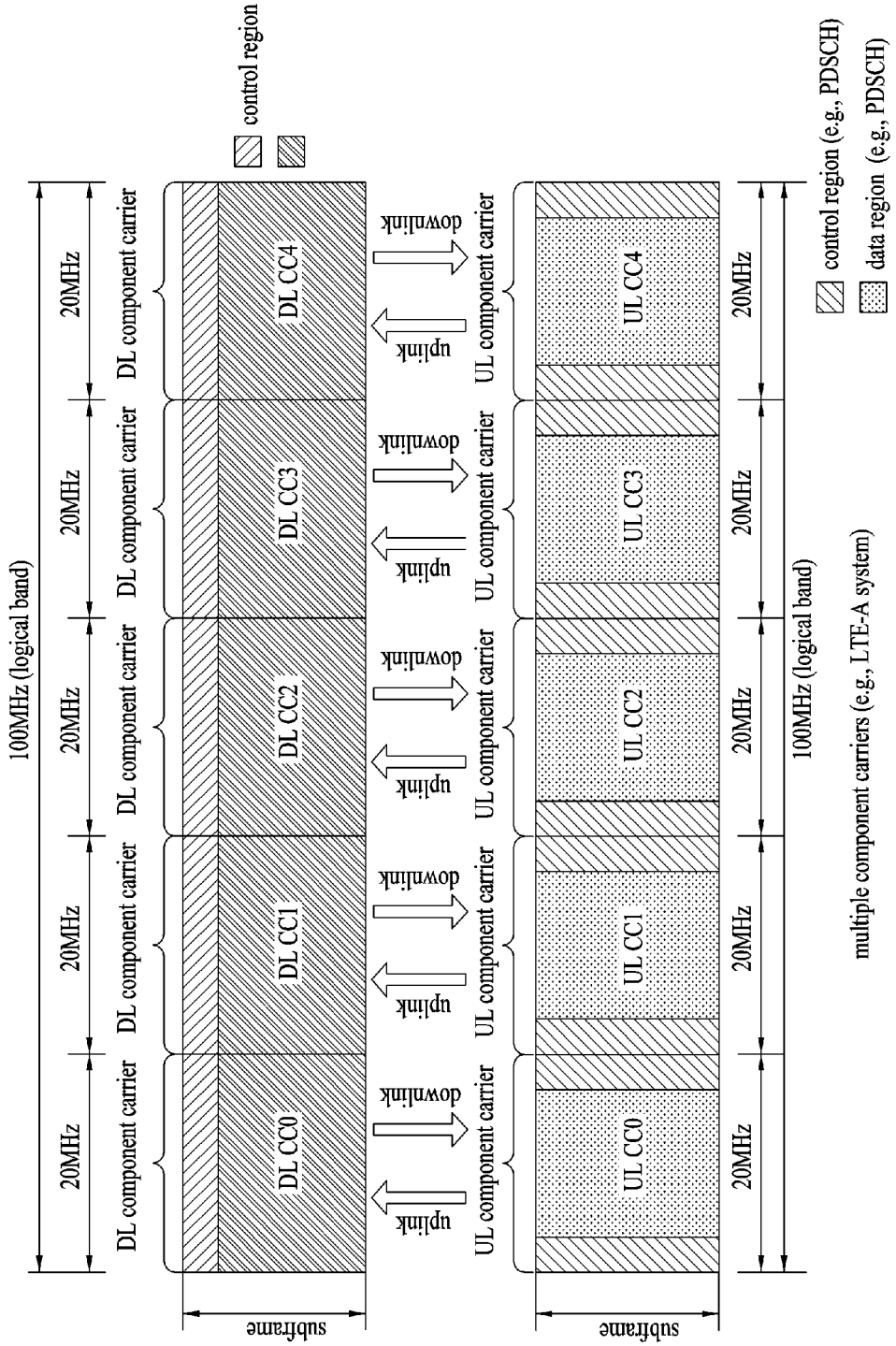
FIG. 11 is a diagram for an example of a CA (carrier aggregation) communication system.

FIG. 11 is a diagram for an example of a CA (carrier aggregation) communication system.

Referring to FIG. 11, a wider UL/DL bandwidth can be supported in a manner of aggregating a plurality of UL/DL component carriers (CC). The terminology 'component carrier' can be replaced by such an equivalent terminology as a carrier, a cell, and the like. Each of the component carriers may be adjacent to each other or non-adjacent to each other in frequency domain. The bandwidth of each of the component carriers can be determined independently. An asymmetric carrier aggregation, which means that the number of downlink component carrier (DL CC) and the number of uplink component carrier (UL CC) are different from each other, is also possible. Meanwhile, control information can be set to be transceived on a specific CC only. The specific CC is called a primary CC and the rest of CCs may be called a secondary CC.

As one example, in case that a cross-carrier scheduling (or a cross-CC scheduling) is applied, PDCCH for DL assignment is transmitted on a DL CC #0 and a corresponding PDSCH can be transmitted on a DL CC #2. For a cross-CC scheduling, introduction of a CIF (carrier indicator field) can be considered. Whether a CIF exists or not within a PDCCH can be semi-statically and user-specifically (or user group-specifically) configured via an upper layer signaling (e.g., RRC signaling). Basics of PDCCH transmission can be summarized as follows.

CIF disabled: PDCCH on DL CC allocates a PDSCH resource on the same DL CC or a PUSCH resource on a singly linked UL CC.

No CIF

Identical to LTE PDCCH structure (identical coding, identical CCE-based resource mapping) and DCI format CIF enabled: PDCCH on DL CC allocates a PDSCH or PUSCH resource on a specific DL/UL CC among a plurality of aggregated DL/UL CCs using a CIF.

Expanded LTE DCI format including a CIF

CIF (if configured) is a stationary x-bit field (e.g., x=3)

CIF (if configured) position is fixed irrespective of a DCI format size

Reuse of LTE PDCCH structure (identical coding, identical CCE-based resource mapping)

In case that a CIF exists within a PDCCH, a base station may be able to assign a PDCCH monitoring DL CC set to reduce BD complexity of a user equipment side. The PDCCH monitoring DL CC set is a part of aggregated whole DL CC and includes at least one DL CC. A user equipment may be able to perform a detection/decoding of the PDCCH on a corresponding DL CC only. In particular, for a scheduling of PDSCH/PUSCH, the base station may be able to transmit the PDCCH on the PDCCH monitoring DL CC only. The PDCCH monitoring DL CC set may be configured UE-specifically, UE group-specifically or cell-specifically. The terminology 'PDCCH monitoring DL CC' can be replaced by such an equivalent terminology as a monitoring carrier, a monitoring cell, and the like. And, a CC aggregated for a user equipment can be replaced by such an equivalent terminology as a serving CC, a serving carrier, a serving cell, and the like.

Figure 12:
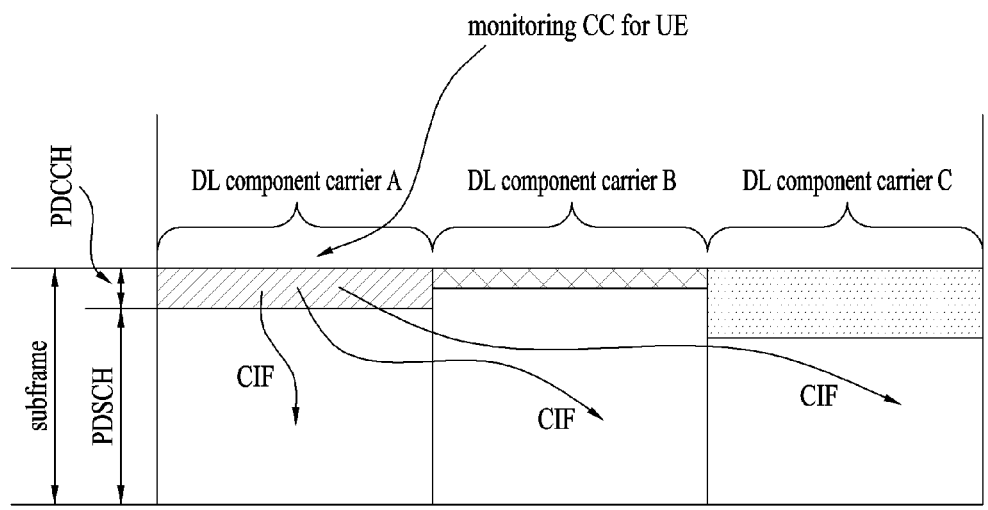
FIG. 12 is a diagram for an example of scheduling in case of aggregating a plurality of carriers with each other.

FIG. 12 is a diagram for an example of a scheduling in case that a plurality of carriers are aggregated with each other. Assume that 3 DL CCs are aggregated and a DL CC A is configured as a PDCCH monitoring DL CC. DL CC A~C can be called a serving CC, a serving carrier, a serving cell, and the like. If a CIF is disabled, each of DL CCs may be able to transmit PDCCH, which schedules PDSCH of each of the DL CCs, only without a CIF according to an LTE PDCCH rule. On the other hand, if a CIF is enabled by an (UE group-specific or cell-specific) upper layer signaling, the DL CC A (monitoring DL CC) may be able to transmit the PDCCH, which schedules the PDSCH of a different DL CC, as well as the PDSCH of the DL CC A using the CIF. In this case, PDCCH is not transmitted on DL CC B and DL CC C, which are not configured as the PDCCH monitoring DL CC. Hence, the DL CC A (monitoring DL CC) should include all of a PDCCH search space related to the DL CC A, a PDCCH search space related to the DL CC B, and a PDCCH search space related to the DL CC C. In the present specification, assume that a PDCCH search space is defined according to a carrier.

As mentioned in the foregoing description, LTE-A considers a use of a CIF in PDCCH to perform a cross-CC scheduling. Whether to use a CIF (i.e., supporting a cross-CC scheduling mode or a non-cross-CC scheduling mode) and switching between modes can be semi-statically/UE-specifically configured via an RRC signaling. After the RRC signaling process is underwent, a user equipment can recognize whether a CIF is used in PDCCH to be scheduled for the user equipment.

Figure 13:
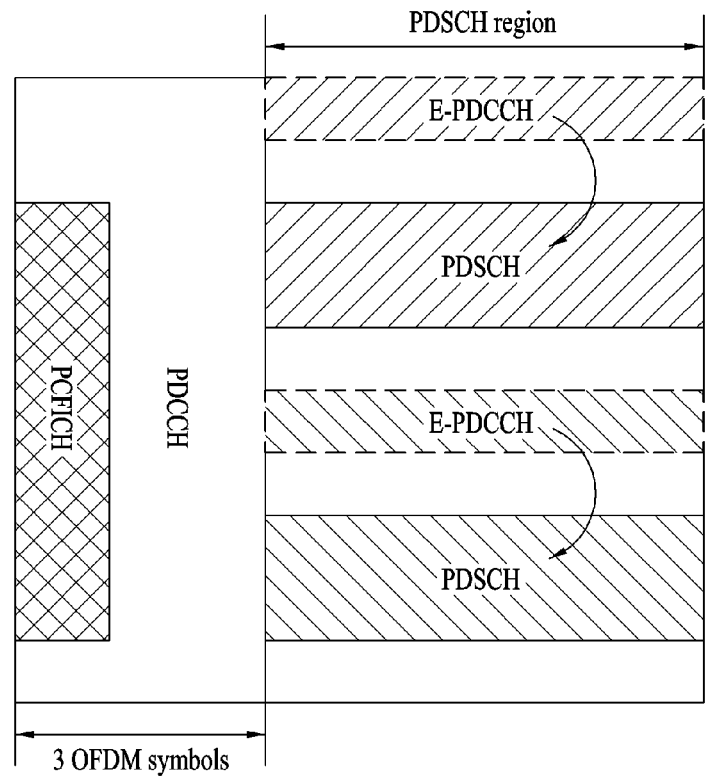
FIG. 13 is a diagram for an example of PDSCH scheduled by EPDCCH and EPDCCH.

FIG. 13 is a diagram for an example of PDSCH scheduled by EPDCCH and EPDCCH.

Referring to FIG. 13, in general, EPDCCH can be used in a manner of defining a part of a PDSCH region transmitting data and a UE should perform blind decoding to detect whether the UE detects EPDCCH of the UE. Although EPDCCH performs a scheduling operation (i.e., PDSCH, PUSCH control) identical to a scheduling operation of a legacy PDCCH, if the number of UEs accessing such a node as an RRH is increasing, the greater numbers of EPDCCHs are assigned to a PDSCH region and the count of blind decoding performed by a UE is increasing. Hence, there may exist a demerit in that complexity may increase.

Figure 14:
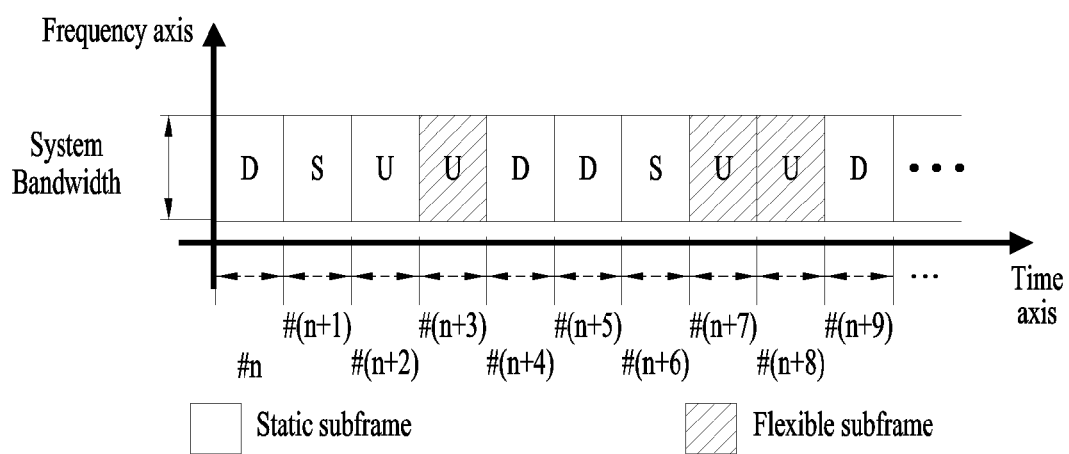
FIG. 14 is a diagram for an example of dividing legacy subframes into a set of static subframes and a set of flexible subframes in TDD system environment.

FIG. 14 is a diagram for an example of dividing legacy subframes into a set of static subframes and a set of flexible subframes in TDD system environment. A legacy uplink-downlink configuration, which is configured via an SIB (system information block) signal in FIG. 8, is assumed as an uplink-downlink configuration #1 (i.e., DSUUDDSUUD). It is assumed that a base station informs a user equipment of reconfiguration information of usage of a radio resource via a predetermined signal.

A radio resource usage change message (reconfiguration message) is used according to a predetermined rule for the purpose of notifying usages of radio resources i) appearing after the timing of receiving the reconfiguration message including the timing of receiving the reconfiguration message ii) appearing after the timing of receiving the reconfiguration message without including the timing of receiving the reconfiguration message or iii) appearing after predetermined time (i.e., subframe offset) elapses from the timing of receiving the reconfiguration message.

Based on the contents mentioned in the foregoing description, the present invention explains a method of performing piggyback on uplink data channel (PUSCH) or a method of efficiently transmitting uplink control information (UCI) on PUSCH in case of changing (i.e., eIMTA (enhanced interference management and traffic adaptation) cell) a usage of a radio resource in a specific cell according to a load state.

According to the present invention, a usage change message (reconfiguration message) can be transmitted in a form of an upper layer signal (e.g., SIB/PBCH/MAC/RRC) or a form of a physical layer signal (e.g., PDCCH/EPDCCH/PDSCH) in a predetermined cell. And, the usage change message may have a UE-specific, cell-specific, UE group-specific or UE group-common characteristic. In addition, the usage change message can be transmitted in a predetermined cell (e.g., PCell) via a USS (UE-specific search space) or a CSS (common search space).

In the following description, for clarity, the present invention is explained based on a 3GPP LTE system. Yet, a range of a system to which the present invention is applied can be extended to a different system except the 3GPP LTE system. And, embodiments of the present invention can be extended to i) a case that TDD cells are used by a carrier aggregation technique (CA) and at least one or more aggregated cells (i.e., a part or all aggregated cells) operate in a radio resource usage change mode and/or ii) a case that a combination of TDD cell(s) and FDD cell(s) is used by a carrier aggregation technique (CA) (e.g., combination of a TDD PCell and a FDD SCell or combination of a FDD PCell and a TDD SCell) and at least one or more aggregated cells (i.e., a part or all aggregated cells) operate in a radio resource usage change mode.

First of all, according to a legacy wireless communication system (3GPP TS 36.213), it is able to secure uplink control information (UCI) piggyback on uplink data channel (PUSCH) or uplink control information transmitted on the PUSCH to be more reliably transmitted via upper layer signal (RRC)-based additional MCS offset configuration (refer to 3GPP TS 36.213 8.6.3). In this case, the upper layer signal-based additional MCS offset, which is set to the UCI transmitted on the PUSCH via piggyback, is configured to secure the UCI to be reliably received. In particular, when a serving cell(s) receives an uplink signal (transmitted from a user equipment), the aforementioned operation may be useful i) in case of receiving strong interference from a neighboring cell performing uplink/downlink communication on an adjacent band/channel or ii) in case of receiving strong interference from a neighboring cell performing uplink/downlink communication on an identical band/channel.

TABLE 3

Control information MCS offset determination

Offset values are defined for single codeword PUSCH transmission and multiple codeword PUSCH transmission. Single codeword PUSCH transmission offsets $\beta_{offset}^{HARQ-ACK}$, $\beta_{offset}^{RI}$ and $\beta_{offset}^{CQI}$ shall be configured to values according to Table 8.6.3-1, 2, 3 with the higher layer signalled indexes $I_{offset}^{HARQ-ACK}$, $I_{offset}^{RI}$, and $I_{offset}^{CQI}$, respectively. Multiple codeword PUSCH transmission offsets $\beta_{offset}^{HARQ-ACK}$, $\beta_{offset}^{RI}$, and $\beta_{offset}^{CQI}$ shall be configured to values according to Table 8.6.3-1, 2, 3 with the higher layer signalled indexes $I_{offset, MC}^{HARQ-ACK}$, $I_{offset, MC}^{RI}$ and $I_{offset, MC}^{CQI}$, respectively.

TABLE 8.6.3-1

Mapping of HARQ-ACK offset values and the index signalled by higher layers

| $I_{offset}^{HARQ-ACK}$ or $I_{offset, MC}^{HARQ-ACK}$ | $\beta_{offset}^{HARQ-ACK}$ |
|---|---|
| 0 | 2.000 |
| 1 | 2.500 |
| 2 | 3.125 |
| 3 | 4.000 |
| 4 | 5.000 |
| 5 | 6.250 |
| 6 | 8.000 |

TABLE 8.6.3-1-continued

Mapping of HARQ-ACK offset values and the index signalled by higher layers

| $I_{offset}^{HARQ-ACK}$ or $I_{offset, MC}^{HARQ-ACK}$ | $\beta_{offset}^{HARQ-ACK}$ |
|---|---|
| 7 | 10.000 |
| 8 | 12.625 |
| 9 | 15.875 |
| 10 | 20.000 |
| 11 | 31.000 |
| 12 | 50.000 |
| 13 | 80.000 |
| 14 | 126.000 |
| 15 | 1.0 |

TABLE 8.6.3-2

Mapping of RI offset values and the index signalled by higher layers

| $I_{offset}^{RI}$ or $I_{offset, MC}^{RI}$ | $\beta_{offset}^{RI}$ |
|---|---|
| 0 | 1.250 |
| 1 | 1.625 |
| 2 | 2.000 |
| 3 | 2.500 |
| 4 | 3.125 |
| 5 | 4.000 |
| 6 | 5.000 |
| 7 | 6.250 |
| 8 | 8.000 |
| 9 | 10.000 |
| 10 | 12.625 |
| 11 | 15.875 |
| 12 | 20.000 |
| 13 | reserved |
| 14 | reserved |
| 15 | reserved |

TABLE 8.6.3-3

Mapping of CQI offset values and the index signalled by higher layers

| $I_{offset}^{CQI}$ or $I_{offset, MC}^{CQI}$ | $\beta_{offset}^{CQI}$ |
|---|---|
| 0 | reserved |
| 1 | reserved |
| 2 | 1.125 |
| 3 | 1.250 |
| 4 | 1.375 |
| 5 | 1.625 |
| 6 | 1.750 |
| 7 | 2.000 |
| 8 | 2.250 |
| 9 | 2.500 |
| 10 | 2.875 |
| 11 | 3.125 |
| 12 | 3.500 |
| 13 | 4.000 |
| 14 | 5.000 |
| 15 | 6.250 |

Yet, if adjacent cells operate in a dynamic change mode (i.e., 'eIMTA mode') of a radio resource usage, in terms of a serving cell (e.g., eIMTA-enabled serving cell or eIMTA-disabled serving cell), although subframes are identically used for the purpose of uplink, interference strength coming from external or the extent of change of interference may vary according to each subframe.

As a specific example, in terms of a serving cell, interference resulted from DL communication (DL interference) is received in a subframe #A, which is used for an uplink usage, from an adjacent cell. In terms of the serving cell, interference resulted from UL communication (UL interference) is received in a subframe #B, which is used for an uplink usage, from the adjacent cell. Hence, "subframe (set)-dependent UL power control" technique configuring an independent power control parameter (e.g., open-loop parameters (e.g., $P_o$, alpha) according to a subframe (set) (and/or independently performing TPC accumulation according to a subframe (set)) is introduced in consideration of interference characteristics different from each other according to a subframe (set) used for a UL usage in terms of a serving cell.

Yet, although PUSCH (and/or UCI transmitted on PUSCH via piggyback) transmit power is set to be higher via the subframe (set)-dependent UL power control in a UL subframe (set) in which strong interference (e.g., DL interference) is received, it is not able to secure successful reception of the UCI transmitted on the PUSCH via piggyback. And, in terms of system implementation (or system management), it is not necessary to configure an identical target BLER (target block error rate) (for PUSCH reception or UCI reception transmitted on the PUSCH via piggyback) according to a UL subframe set of which interference characteristics are different from each other. Hence, as shown in Table 4 in the following, MCS offset independent from each other (e.g., different from each other) can be set to UCI (i.e., RI, CQI) transmitted on the PUSCH via piggyback according to an UL subframe set of which interference characteristic is different from each other.

TABLE 4

If a UE is configured with two subframe sets for uplink power control of a serving cell, the UE can be configured by RRC signaling with two sets of $\beta_{offset}^{RI}$ and $\beta_{offset}^{CQI}$ values, one for each UL subframe set for the serving cell.

In the following, the present invention proposes not only a method of enabling CSI-related UCI (i.e., RI, CQI), which are transmitted on PUSCH via piggyback according to UL subframe set of which interference characteristics is different from each other, to have MCS offset configuration independent from each other (e.g., different from each other) but also a method of enabling HARQ-ACK information, which are transmitted on PUSCH via piggyback according to UL subframe set of which interference characteristics is different from each other, to apply MCS offset configuration (i.e., $\beta_{offset}^{HARQ-ACK}$) independent from each other (e.g., different from each other).

In particular, the present invention is useful when SCell (e.g., eIMTA-enabled SCell)-related DL-reference UL/DL configuration is deducted according to Table 5 in the following in environment to which carrier aggregation technique (CA) is applied. In other word, this is because i) a DL-reference UL/DL configuration finally applied to an SCell (e.g., eIMTA-enabled SCell) is unable to secure HARQ-ACK transmission (i.e., HARQ-ACK transmitted on PUSCH via piggyback) in an UL subframe (i.e., static UL SF) of eIMTA (or RRC-configured) DL HARQ reference configuration set to the SCell or ii) the DL-reference UL/DL configuration finally applied to the SCell is unable to secure HARQ-ACK transmission (i.e., HARQ-ACK transmitted on PUSCH via piggyback) in an UL subframe set in which relatively low interference is received (refer to 3GPP TS 36.213).

TABLE 5

Rule of deducting DL-reference UL/DL configuration according to cell when at least one or more cells operate in eIMTA mode
For a UE configured with CA and eIMTA on at least one serving cell, the Rel-10/11 TDD-TDD CA UE behaviors on HARQ-ACK transmission and soft buffer handling and the Rel-12 FDD-TDD CA UE behaviors on HARQ-ACK transmission and soft buffer handling apply, except that the (eIMTA) DL HARQ reference configuration replaces the UL-DL configuration indicated by SIB1 (in case of PCell) and the UL-DL configuration indicated by tdd-Config-r10 (in case of SCell).
Method of deducting PL-reference UL/DL configuration of SCell (serving cell) based on Rel-10/11 CA operation
DL-reference UL/DL configuration for serving cell based on pair formed by (Primary cell UL/DL configuration, Secondary cell UL/DL configuration)

| Set # | (SIB1-based UL-DL configuration set to PCell, tdd-Config-r10-based UL-DL Configuration set to SCell (serving cell)) | DL-reference U/D configuration |
|---|---|---|
| Set 1 (Self scheduling or CCS) | (0, 0) | 0 |
| | (1, 0), (1, 1), (1, 6) | 1 |
| | (2, 0), (2, 2), (2, 1), (2, 6) | 2 |
| | (3, 0), (3, 3), (3, 6) | 3 |
| | (4, 0), (4, 1), (4, 3), (4, 4), (4, 6) | 4 |
| | (5, 0), (5, 1), (5, 2), (5, 3), (5, 4), (5, 5), (5, 6) | 5 |
| | (6, 0), (6, 6) | 6 |
| Set 2 (Self scheduling) | (0, 1), (6, 1) | 1 |
| | (0, 2), (1, 2), (6, 2) | 2 |
| | (0, 3),(6, 3) | 3 |
| | (0, 4), (1, 4), (3, 4), (6, 4) | 4 |
| | (0, 5), (1, 5), (2, 5), (3, 5), (4, 5), (6, 5) | 5 |
| | (0, 6) | 6 |
| Set 3 (Self scheduling) | (3, 1), (1, 3) | 4 |
| | (3, 2), (4, 2), (2, 3), (2, 4) | 5 |
| Set 4 (CCS) | (0, 1), (0, 2), (0, 3), (0, 4), (0, 5), (0, 6) | 0 |
| | (1, 2), (1, 4), (1, 5) | 1 |
| | (2, 5) | 2 |
| | (3, 4), (3, 5) | 3 |
| | (4, 5) | 4 |
| | (6, 1), (6, 2), (6, 3), (6, 4), (6, 5) | 6 |
| Set 5 (CCS) | (1, 3) | 1 |
| | (2, 3), (2, 4) | 2 |
| | (3, 1), (3, 2) | 3 |
| | (4, 2) | 4 |

In this case, as an example, in the aforementioned Table 5 (i.e., method of deducting DL-reference UL/DL configuration of SCell (serving cell) based on Rel-10/11 CA operation), a PCell can always assume SIB1 UL-DL configuration set to the PCell as DL-reference UL/DL configuration irrespective of self-scheduling or cross carrier scheduling (CCS).

In particular, as an example of not securing the aforementioned reliable HARQ-ACK transmission, assume that two cells (i.e., non-eIMTA PCell and eIMTA-enabled SCell) are set to a UE (eIMTA UE) to which PUCCH/PUSCH simultaneous transmission is not set using a carrier aggregation technique, SIB1 UL-DL configuration of the non-eIMTA PCell corresponds to UL-DL configuration 1, SIB1 UL-DL configuration of the eIMTA-enabled SCell corresponds to UL-DL configuration 1 and eIMTA (or RRC-configured) DL HARQ reference configuration of the eIMTA-enabled SCell corresponds to UL-DL configuration 5. In this case, in terms of the eIMTA-enabled SCell, assume that a fixed UL SF (i.e., assume a position as relatively low interference is received from external) corresponds to a UL SF #2 and a flexible UL SF (i.e., assume a position as relatively high interference is received from external) corresponds to a UL SF #3, #7 and #8. And, if CCS (cross carrier scheduling) is set to the two cells, a final DL-reference UL/DL configuration of the eIMTA-enabled SCell is determined by the UL-DL configuration 1. Yet, in this case, since the eIMTA (or RRC-configured) DL HARQ reference configuration of the eIMTA-enabled SCell (i.e., UL-DL configuration 5) and initial DL-reference UL/DL configuration (i.e., UL-DL configuration 1) are different from each other, in terms of the eIMTA-enabled SCell, HARQ-ACK can be transmitted on PUSCH (i.e., PUSCH transmitted in the SCell) via piggyback in positions assumed as a flexible UL SF.

Specifically, if actual UL-DL configuration (i.e., UL-DL configuration (re)configured via reconfiguration DCI) of the eIMTA-enabled SCell is configured by UL-DL configuration 2, in terms of the eIMTA-enabled SCell, (DL SF #0, #1, #3 and #9-related) HARQ-ACK can be transmitted on PUSCH (i.e., PUSCH transmitted on the SCell) via piggyback in a UL SF #7 assumed as a flexible UL SF.

Hence, as one embodiment of the present invention, if subframe (set)-dependent UL power control-related two subframe sets (i.e., UL PC SF SET #0 (subframe set in which relatively low interference (e.g., UL interference) is received) and UL PC SF SET #1 (subframe set in which relatively high interference (e.g., DL interference) is received) are set to a specific cell (e.g., eIMTA-enabled cell), the cell (or a base station) can respectively inform a UE (e.g., eIMTA UE) of $\beta_{offset,set\#0}^{HARQ-ACK}$ for the UL PC SF SET #0 and $\beta_{offset,set\#1}^{HARQ-ACK}$ for the UL SF SET #1 via a predetermined signal (e.g., upper layer signal (RRC)). In this case, the $\beta_{offset,set\#1}^{HARQ-ACK}$ can be configured by a relatively higher value compared to the $\beta_{offset,set\#0}^{HARQ-ACK}$.

As a different embodiment, i) if the number of subframe (set)-dependent UL power control-related subframe sets of a corresponding cell changes to two from one or ii) if subframe (set)-dependent UL power control is not configured on the corresponding cell and then the subframe (set)-dependent UL power control is (re)configured (enabled), the $\beta_{offset,set\#0}^{HARQ-ACK}$ can be configured to reuse/inherit a previously used (or configured) value (e.g., $\beta_{offset}^{HARQ-ACK}$) as it is (e.g., an MCS offset value for a UL PC SF SET #1 can be signaled only).

In addition, i) if the number of subframe (set)-dependent UL power control-related subframe sets of a corresponding cell changes to one from two or ii) if subframe (set)-dependent UL power control is configured (enabled) on the corresponding cell and then the subframe (set)-dependent UL power control is not configured (disabled), an MCS offset value configured for a specific UL power control subframe set (UL PC SF SET) or an MCS offset value applied/used for the specific UL power control subframe set (e.g., an MCS offset value (i.e., $\beta_{offset,set\#0}^{HARQ-ACK}$) configured for UL PC SF SET #0) can be configured to reuse/inherit as it is (i.e., it is not necessary to additionally signal the MCS offset value).

In particular, according to the present invention, when a subframe set-based UL power control (SF SET DEPENDENT UL PC) operation is configured, a UL PC SF SET #0-related beta offset value inherits a legacy beta offset instead of additionally receiving the value via RRC signaling. On the contrary, when the subframe set-based UL power control (SF SET DEPENDENT UL PC) operation is released (disabled), a UL PC SF SET #0-related beta offset value is inherited for a beta offset value applied to all UL SFs instead of additionally receiving the beta offset value applied to all UL SFs via RRC signaling.

As a further different embodiment, whether subframe (set)-dependent UL power control-related two subframe sets (i.e., 2 subframe sets for uplink power control) are configured and/or whether subframe (set)-dependent UL power control operation is set and/or whether eIMTA mode is configured can be different from each other according to a cell, configuration/rule in the following can be additionally applied to the present invention.

In the following description, for clarity of explaining the present invention, assume a situation that two cells (e.g., (non-eIMTA) PCell and eIMTA-enabled SCell) are used by a carrier aggregation technique. Yet, the present invention can also be extended to i) a situation that three or more cells are used by carrier aggregation technique and/or ii) a case that subframe (set)-dependent UL power control-related two subframe sets (i.e., 2 subframe sets for uplink power control) or a subframe (set)-dependent UL power control operation is set to at least one or more cells and/or iii) a case that at least one or more cells operate in eIMTA mode.

Although subframe (set)-dependent UL power control-related two subframe sets or a subframe (set)-dependent UL power control is set to a specific cell (e.g., eIMTA-enabled SCell) related to carrier aggregation technique and $\beta_{offset}^{HARQ-ACK}$ (i.e., $\beta_{offset,set\#0}^{HARQ-ACK}$ and $\beta_{offset,set\#1}^{HARQ-ACK}$) independent from each other (e.g., different from each other) are set/signaled according to a subframe set, i) if HARQ-ACK information is transmitted on PUSCH via piggyback in a different cell (e.g., (non-eIMTA) PCell) related to carrier aggregation technique and/or subframe (set)-dependent UL power control-related two subframe sets or a subframe (set)-dependent UL power control operation is not set to the different cell (e.g., (non-eIMTA) PCell) or ii) if HARQ-ACK information is transmitted on PUSCH via piggyback in a different cell (e.g., (non-eIMTA) PCell) related to carrier aggregation technique and/or the different cell (e.g., (non-eIMTA) PCell does not operate in eIMTA mode, it is able to configure a specific subframe set-related $\beta_{offset}^{HARQ-ACK}$ (which is set to a specific cell (e.g., eIMTA-enabled SCell)) to be applied according to a predetermined rule.

In this case, the specific subframe set can be defined by one selected from the group consisting of i) a set (i.e., UL PC SF SET #0, $\beta_{offset,set\#0}^{HARQ-ACK}$) including a relatively lower subframe set index, ii) a subframe set in which relatively lower (and/or static) interference is received among the two subframe sets and iii) a set in which a static UL subframe (e.g., UL SF of eIMTA (or RRC-configured) DL HARQ reference configuration) is included.

Or, in relation to a specific subframe set, a base station can inform a UE of a subframe set-related $\beta_{offset}^{HARQ-ACK}$ to be applied via a predetermined signal (e.g., RRC signal).

In particular, according to the present invention, if whether to configure subframe set-based UL power control (SF SET DEPENDENT UL PC) operation is independent from each other according to a cell to which a carrier aggregation technique is applied, "UL PC SF SET #0-related beta offset value" is commonly applied to "all UL SFs of cells to which SF SET DEPENDENT UL PC operation is not set" and "all UL PC SF SET #0 of cells to which SF SET DEPENDENT UL PC operation is set" only. And, if whether to configure subframe set-based UL power control (SF SET DEPENDENT UL PC) operation is independent from each other according to a cell to which a carrier aggregation technique is applied, "UL PC SF SET #1-related beta offset value" is commonly applied to "all UL PC SET #1 of cells to which SF SET DEPENDENT UL PC operation is set" only.

Embodiment of the present invention can be configured to be restrictively applied to at least one selected from the group consisting of i) an SCell (operating in eIMTA mode), ii) an SCell (operating in eIMTA mode) to which subframe (set)-dependent UL power control-related two subframe sets (i.e., 2 subframe sets for uplink power control) or a subframe (set)-dependent UL power control operation is set, iii) a case that simultaneous transmission of PUCCH and PUSCH is not configured, iv) a case that at least one or more cells operate in eIMTA mode or subframe (set)-dependent UL power control operation is applied, v) a case that SIB1 UL-DL configuration of PCell and tdd-Config-r10-based UL-DL configuration of SCell are different from each other, vi) a case that eIMTA (or RRC-configured) DL HARQ reference configuration of PCell and eIMTA (or RRC-configured) DL HARQ reference configuration of SCell are different from each other, vii) a case that CCS (cross carrier scheduling) is configured, viii) a case that self-scheduling is configured, ix) a half-duplex (HD) UE, x) a UE incapable of simultaneously transmitting PUCCH and PUSCH and x) a UE capable of simultaneously transmitting PUCCH and PUSCH in a situation to which a carrier aggregation (CA) technique is applied.

As an example, the present invention can also be applied to a case that a combination of a TDD cell(s) and a FDD cell(s) is used by a carrier aggregation technique (e.g., i) in case of a combination of a TDD PCell and a FDD Scell or a combination of a FDD PCell and a TDD Scell) and a case that at least one or more (i.e., a part or all of) TDD cell(s) operate in a radio resource usage change mode.

Moreover, the aforementioned embodiments of the present invention can be configured to be restrictively applied to at least one selected from the group consisting of i) a case that a radio resource usage of at least one or more specific cells is dynamically changed according to a load state, ii) a case that a transmission mode (TM) of at least one or more specific cells is designated by a predetermined transmission mode, iii) a case that UL-DL configuration of at least one or more specific cells (e.g., TDD eIMTA cell) is (re)configured by a specific value, iv) a case that CCS is configured and v) a case that self-scheduling is configured in a situation to which a carrier aggregation (CA) technique is applied.

Moreover, the aforementioned embodiment/configuration/rule/examples can be interpreted as one of methods to implement the present invention and it is apparent that the embodiment/configuration/rule/examples are recognized as a sort of embodiment. And, the aforementioned embodiments can be implemented independently and can also be implemented by a combination or an aggregated form of a part of embodiments.

Moreover, a base station can inform a user equipment of information on the aforementioned embodiment/configuration/rule/examples of the present invention or information on whether the embodiment/configuration/rule/examples of the present invention is applied via a predetermined signal (e.g., a physical layer or upper layer signal).

And, the aforementioned embodiments can also be applied to a case that cells including different TDD UL-DL configuration (e.g., SIB1 UL-DL configuration (PCell), RadioResourceConfigCommonSCell IE (Scell)) are used by a carrier aggregation (CA) technique and a radio resource usage of at least one or more cells among the cells is dynamically changed according to a load state.

And, the aforementioned embodiments of the present invention can be configured to be restrictively applied to i) a case that a transmission mode (TM) of at least one or more cells is designated by a predetermined transmission mode and/or ii) a case that UL-DL configuration of at least one or more specific cells (e.g., TDD eIMTA cell) is (re)configured by a specific value.

Figure 15:
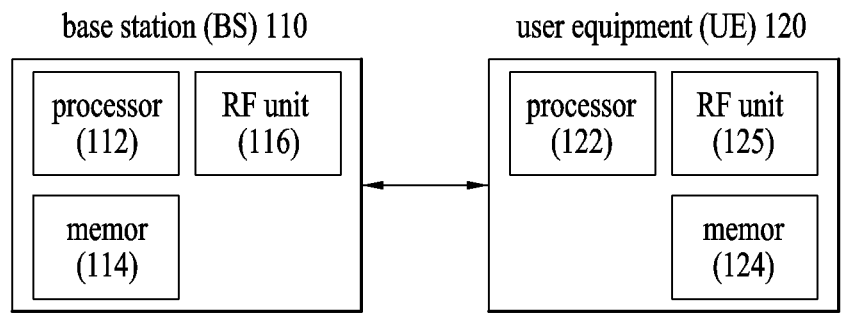
FIG. 15 is a diagram for a base station (BS) and a user equipment (UE) applicable to one embodiment of the present invention.

FIG. 15 is a diagram for a base station (BS) and a user equipment (UE) applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 15, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of transmitting uplink control information in a wireless communication system supporting usage change of a radio resource and apparatus therefor are described centering on examples applied to 3GPP LTE system, it may be applicable to various kinds of wireless communication systems as well as to the 3GPP LTE system.

What is claimed is:

1. A method of transmitting uplink control information (UCI) in a wireless communication system configured for carrier aggregation of a serving cell configured with a first type and a second type uplink power control subframe set and another cell not configured with uplink power control subframe sets, the method performed by a user equipment (UE) and comprising:
receiving, from the serving cell configured with the first type and the second type uplink power control subframe set, a first type of UCI transmission beta offset and a second type of UCI transmission beta offset for a plurality of UCI transmission subframes;
determining a UCI transmission subframe uplink power for the plurality of UCI transmission subframes based on a corresponding one of the first type of beta offset or the second type of the beta offset; and
transmitting the UCI based on the determined UCI transmission subframe uplink power,
wherein the transmitting comprises:
if a UCI transmission subframe of the plurality of UCI transmission subframes belongs to the first type uplink power control subframe set, the UCI is transmitted to the serving cell and the another cell with an uplink power that is only based on the first type of beta offset, and
if a UCI transmission subframe of the plurality of UCI transmission subframes belongs to the second type uplink power control subframe set, the UCI is transmitted to the serving cell with an uplink power that is only based on the second type of beta offset.

2. The method of claim 1, wherein the first type uplink power control subframe set and the second type uplink power control subframe set are configured by RRC (Radio Resource Control) signaling.

3. The method of claim 1,
wherein the first type of UCI transmission beta offset is one of a first UCI transmission beta offset ACK (acknowledgement), a first UCI transmission beta offset RI (rank indicator) and a first UCI transmission beta offset CQI (Channel Quality Indicator), and
wherein the second type of UCI transmission beta offset value is one of a second UCI transmission beta offset ACK, a second UCI transmission beta offset RI and a second UCI transmission beta offset CQI.

4. The method of claim 1, wherein, if the UE is preconfigured with a UCI transmission beta offset for controlling the uplink power, the method further comprises:
using, by the UE, the preconfigured UCI transmission beta offset in place of the received first type of UCI transmission beta offset when determining the UCI transmission subframe uplink power.

5. A User Equipment (UE) for transmitting UCI (uplink control information) in a wireless communication system configured for carrier aggregation of a serving cell configured with a first type and a second type uplink power control subframe set and another cell not configured with uplink power control subframe sets, the UE comprising:
a radio frequency unit; and
a processor operatively connected with the radio frequency unit,
the processor is configured to:
receive, from the serving cell configured with the first type and the second type uplink power control subframe set, a first type of UCI transmission beta offset and a second type of UCI transmission beta offset for a plurality of UCI transmission subframes;
determine a UCI transmission subframe uplink power for the plurality of UCI transmission subframes based on a corresponding one of the first type of beta offset or the second type of the beta offset; and
transmit the UCI based on the determined UCI transmission subframe uplink power,
wherein, if a UCI transmission subframe of the plurality of UCI transmission subframes belongs to the first type uplink power control subframe set, the UCI is transmitted to the serving cell and the another cell with an uplink power that is only based on the first type of beta offset, and
wherein, if a UCI transmission subframe of the plurality of UCI transmission subframes belongs to the second type uplink power control subframe set, the UCI is transmitted to the serving cell with an uplink power that is only based on the second type of beta offset.

6. The UE of claim 5, wherein the first type uplink power control subframe set and the second type uplink power control subframe set are configured by RRC (Radio Resource Control) signaling.

7. The UE of claim 5,
wherein the first type of UCI transmission beta offset is one of a first UCI transmission beta offset ACK (acknowledgement), a first UCI transmission beta offset RI (rank indicator) and a first UCI transmission beta offset CQI (Channel Quality Indicator), and
wherein the second type of UCI transmission beta offset value is one of a second UCI transmission beta offset ACK, a second UCI transmission beta offset RI and a second UCI transmission beta offset CQI.

8. The UE of claim 5, wherein, if the UE is preconfigured with a UCI transmission beta offset for controlling the uplink power, the processor is further configured to use the preconfigured UCI transmission beta offset in place of the received first type of UCI transmission beta offset when determining the UCI transmission subframe uplink power.

* * * * *